Patented Apr. 29, 1941

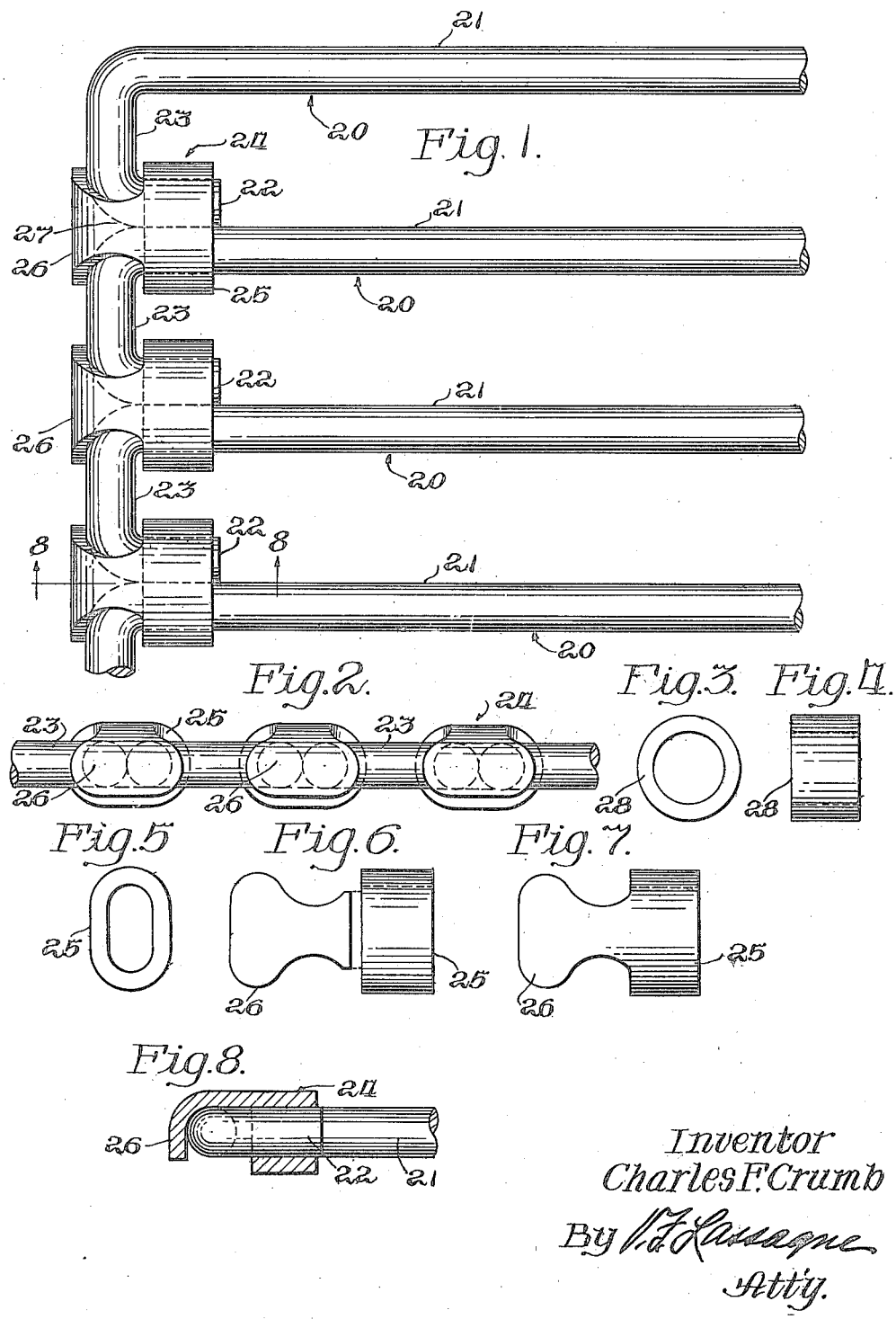

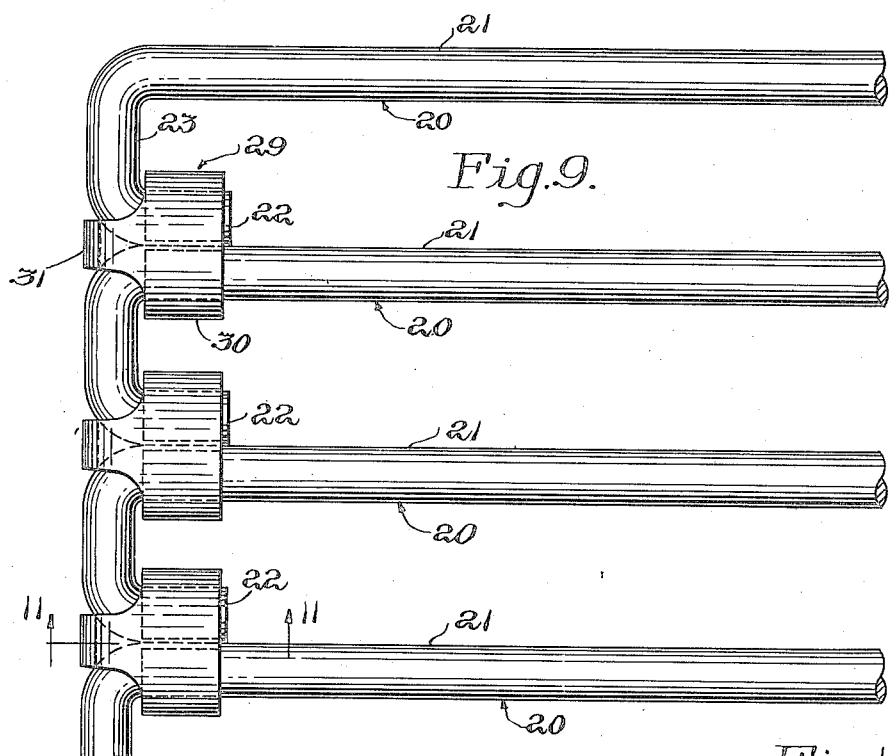
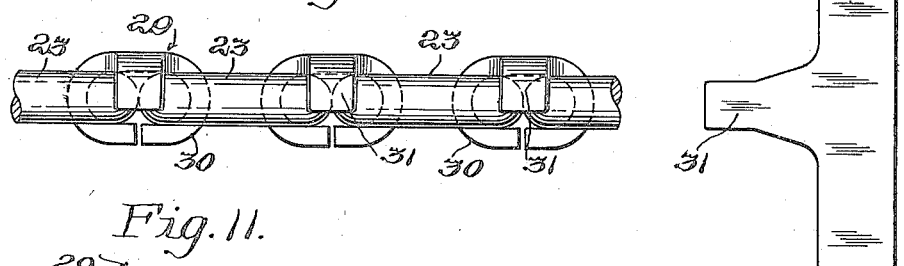
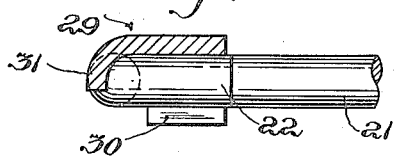
Inventor
Charles F. Crumb

2,239,994

UNITED STATES PATENT OFFICE 2,239,994

ELEVATOR STRUCTURE

Charles F. Crumb, Chicago, Ill., assignor to International Harvester Company, a corporation of New Jersey Application December 30, 1937, Serial No. 182,428

19 Claims. (Cl. 198—195)

This invention relates to a conveyer, such as an elevator for a potato digger. More particularly it relates to a means for joining the individual links of the conveyer or elevator.

Elevators for potato diggers normally consist of conveyers made up of links having reversely bent ends. The ends of one link hook into the main part of the body of the next link, and thus the links are secured into a complete conveyer. With such an arrangement, the links are not positively held against one another and there is a great deal of wear because of the relative movement of the contacting portions, and because of lack of ample bearing surface one upon another. Frequently, special wear clips have been provided which fit over each portion subject to wear. These, however, are expensive and difficult to install.

The primary object of this invention is to provide a means for joining the links of a potato digger elevator which will reduce the wear between links without the use of special wear plates.

A further object is the provision of a clip for holding positively the contacting portions of adjacent links.

Another object is to provide a method of making clips for joining links of an elevator structure.

Another object of the invention is the provision of an improved elevator structure through the use of a novel clip for joining individual links of the structure.

Other objects will become apparent from the disclosure.

According to the present invention, the reversely bent ends of one elevator link are placed in contact with the body portion of one adjacent elevator link, but not in interlocking relation. Then, a metal clip is applied to the contacting portions of the two links, a main part of the link surrounding and embracing the contacting portions and an auxiliary portion extending partially around adjoining portions of the link so as to hold the clip in place. In one form of the invention, the auxiliary part of the clip extends over the outside line of the links. In another form, the auxiliary portion is narrower and extends between the links approximately even with the outside line thereof, filling in the space between the bent ends of adjoining links. The clips may be made in one of two ways. One way is to cut a sheet of metal to the proper shape and bend it to the form required either before or during the application of the clip to the links. The preferred way, however, is to provide a short circular section of tubing and flatten it partially to form the main part of the link and to weld an auxiliary part of the proper shape to the main part.

In the drawings—

Figure 1 shows one end of a series of adjacent links of a potato digger elevator joined by one form of the improved clip;

Figure 2 shows an end view of the structure of Figure 1;

Figure 3 shows an end view of a short tubular section from which the main part of the wear clip is made according to the preferred method;

Figure 4 shows a side view of the same tubular section;

Figure 5 shows this tubular section after it has been formed to shape by flattening;

Figure 6 shows the flattened tubular section and an auxiliary part in position to be joined thereto;

Figure 7 shows the preferred form of clip upon completion;

Figure 8 shows a section taken along the lines 8—8 of Figure 1;

Figure 9 shows structure similar to that of Figure 1, the links being joined by a modified form of clip;

Figure 10 shows a side view of the structure of Figure 9;

Figure 11 shows a section taken along the lines 11—11 of Figure 9; and,

Figure 12 shows a blank from which the modified form of wear clip may be made.

As seen in Figure 1, there is a plurality of links 20 of an elevator structure, only one end of each link being shown since the other end is identical with the end shown. Each link consists of a main or body portion 21 with a reversely bent end portion 22 and a transverse portion 23 connecting the body and end portions. The end portion of one link is adjacent the body portion of the next link. A novel clip 24 holds each pair of adjacent links in contact or nearly in contact and has a main part 25 consisting of a flattened tubular section embracing the adjacent portions of the links and an auxiliary part 26 extending from one flattened side of the main part in partially embracing relation over the outside line of the links. It will thus be seen that each pair of links is held by a clip, the adjacent portions of the links being kept in contact by the main tubular part of a clip, and the clips being retained in place on the links by the auxiliary portion which serves to lock the clips on the links. The auxiliary part of each clip has a section 27 considerably narrower than the section of the auxiliary part over the outside line of the links. This narrower section 27 allows a considerable angular movement between the links necessary to the proper operation of the elevator. By the above arrangement, the adjacent portions of the links are held so that there is not much relative movement. These portions are shown in contact in the drawings but it is to be understood that when the elevator is in use, there will be a slight spacing between these portions. Wear takes place between the clip and the parts of the links which it contacts. Since the clip and the links are in contact over relatively large surfaces, the wear is considerably less than in the case of links with interlocking ends where there is either point contact or line contact.

The novel clip may be produced as shown in Figures 3 to 7. A short circular section 28 is provided and flattened, as shown in Figure 5, to become the main part 25 of the clip. The auxiliary part 26 is made in the form of a flat piece, as shown in Figure 6, and is flash welded to one flattened side of the main part, as shown in Figure 7. This wear clip may be also made from a flat blank bent to shape in the manner to be described in connection with the modified form of clip.

Figure 9 shows one end of a series of elevator links 20 similar to those of Figure 1. The reversely bent end portions 22 of the links lie immediately adjacent the body portions 21 of adjacent links in the same manner, as shown in Figure 1. In this case, however, the modified form of clip 29 is provided. This clip may be formed from a blank, as shown in Figure 12, consisting of a main portion 30 bent into flattened tubular shape to embrace the contacting portions of the adjacent links and an auxiliary part 31, having a section diminishing in width in a direction away from the main part and another section of constant width, bent partially over the links at sections adjoining the adjacent portions thereof and to a certain extent between the links, as shown in Figure 9. It will be seen from this figure that the auxiliary part of the clip is substantially in line with the outside line of the links. The ends of the main part of the clip are brought into abutting relation, as shown in Figure 10, and may be welded if desired. It is to be understood this clip may also be formed by the method of Figures 3 and 7.

Thus, it will be seen that a modified means has been provided for holding the adjacent portions of the links in relatively fixed relation. There is a considerable reduction in wear, since, as described in connection with Figure 1, wear takes place over an area of contact between a clip and elevator links. The modified form of clip in Figure 9 is similar to that of Figure 1, except that the auxiliary or locking part of the clip extends somewhat between the links and within the outside line, instead of over the outside line.

The above described forms of elevator structures have been devised for use with a potato digger, but it will be readily appreciated that they may be used with elevators or conveyers for other purposes. The term "elevator," as herein used, is intended to include conveyers generally, even if no actual elevation of material handled is present.

The intention is to limit the invention only within the terms of the appended claims.

What is claimed is:

1. In an elevator structure comprising a pair of links, each including a body portion, a reversely bent end portion, and a transverse connecting portion between the end and body portions, said links being positioned in parallel side-by-side relation with the end portion of one link immediately adjacent the body portion of the other link and the transverse portions of the links in line and with a space between the links at the region of juncture of the transverse and end portions of the first link and the region of juncture of the body and transverse portions of the second link, the combination with said links of a clip having a main portion surrounding the adjacent parts of the links and abutting on one side thereof and having an auxiliary portion extending from the main portion on the opposite side of the links and into the aforementioned space between the links.

2. In an elevator structure comprising a pair of links, each including a body portion, a reversely bent end portion, and a transverse connecting portion between the end and body portions, said links being positioned in parallel side-by-side relation with the end portion of one link immediately adjacent the body portion of the other link, the combination with said links of a clip having a main portion surrounding the adjacent parts of the links and abutting on one side thereof and having an auxiliary locking portion extending from the main portion on the opposite side of the links and over the regions of juncture at the transverse and end portions of the first link and the body and transverse portions of the second link.

3. In an elevator structure comprising a pair of links, each including a body portion, an offset end portion, and a transverse connecting portion between the end and body portions, said links being positioned in parallel side-by-side relation with the end portion of one link immediately adjacent the body portion of the other link, the combination with said links of a clip having a main portion surrounding the adjacent parts of the links and abutting on one side thereof and having an auxiliary portion extending from the main portion on the opposite side of the links over and around the regions of juncture of the end and transverse portions of the first link and the transverse and body portions of the second link.

4. An elevator structure comprising a pair of elevator links, each comprising a body and a reversely bent end, said links being in parallel side-by-side relation with the end of one link immediately adjacent the body of the other link and with a space between the links immediately adjacent their region of contact at sections of the links joining the ends and bodies, and a clip formed of sheet material having a main portion extending around the adjacent parts of the links into abutment on one side thereof and having an auxiliary portion extending from the main portion on the opposite side of the links into the aforementioned space between the links.

5. A conveyer structure comprising a pair of links, each having a body and a reversely bent end, the links being in side-by-side relation with the end of one link immediately adjacent the body of the other link, and a clip having a tubular portion enclosing the adjacent portions of the links and having an auxiliary portion extending therefrom about the portions of the links immediately adjacent those portions so as to lock the clip on the links.

6. A conveyer structure comprising a pair of links having body portions and offset end portions and being positioned with the body portion of one link immediately adjacent the end portions of the other link, and a pair of clips, each having a part embracing an end portion of the first link and the section of the body portion of the other link adjacent thereto and having a part extending around the sections of the links between the body portions and the end portions.

7. A conveyer structure comprising a pair of links, each including a body portion, a reversely bent end portion, and a transverse connecting portion between the end and body portions, said links being positioned in parallel side-by-side relation with the end portion of one link immediately adjacent the body portion of the other link and the transverse portions in line, and a clip having a main part embracing the adjacent portions of the links and abutting on one side thereof and having an auxiliary part extending therefrom on the opposite side of the links in a narrow neck over the junctures of the transverse and end portion of the first link and the body and transverse portions of the second link and further extending in at least partially embracing relation over the outside line of the transverse portions of the links in a widened section.

8. A conveyer structure comprising a pair of links, each including a body portion, a reversely bent end portion, and a transverse connecting portion between the end and body portions, said links being positioned in parallel side-by-side relation with the end portion of one link adjacent the body portion of the other link and the transverse portions substantially in line, and a clip having a main part formed of a short tubular section embracing the adjacent portions of the links and having an auxiliary part welded to the main part with a narrow section adjacent the weld extending over the juncture of the transverse and end portions of the first link and the body and transverse portions of the second link and further extending in at least partially embracing relation over the outside line of the transverse portions of the links in a widened section.

9. A conveyer structure comprising a pair of links, each including a body portion and a reversely bent end portion, said links being positioned in parallel side-by-side relation, with the end portion of one link adjacent the body portion of the other link, and a clip having a main part formed of a short tubular section embracing the adjacent portions of the links and having an auxiliary part welded to the main part with a narrow section adjacent the weld extending therefrom and over the portions of the links connecting the body portion and the end portions thereof in a widened section in at least partially embracing relation.

10. A conveyer structure comprising a pair of links, each including a body portion, a reversely bent end portion, said links being positioned in parallel side-by-side relation with the end portion of one link adjacent the body portion of the other link, and a clip having a main part embracing the adjacent portions of the links and having an auxiliary part extending therefrom in a narrow neck and widening out and at least partially embracing the portions of the links connecting the end portions and the body portion.

11. A conveyer structure comprising a pair of links, each including a body portion and a reversely bent end portion in parallel offset relation to the body portion, said links being positioned in side-by-side relation with the end portion of one link immediately adjacent the body portion of the other link, and a clip having a main portion embracing the adjacent portions of the links and having an auxiliary portion extending therefrom at least partially over the portions of the links connecting the body portions and the end portions thereof so as to lock the clip on the links.

12. A conveyer structure comprising a pair of links having bodies and reversely bent ends and positioned with an end of the one link immediately adjacent and entirely on the same side of the body of the other link as the body of the one link, and a clip embracing the adjacent end and body of the links.

13. A conveyer structure comprising a pair of links having bodies and reversely bent ends and positioned with an end of the one link immediately adjacent and entirely on the same side of the body of the other link as the body of the one link, and a clip embracing the adjacent end and body of the links and extending partially around portions of the links adjoining the adjacent end and body so as to be locked in place on the links.

14. A clip for use in joining links of a conveyer structure comprising a main part formed of a flattened tubular section and an auxiliary part welded to the main part and having a first portion adjacent the weld narrower than the weld and a second portion beyond the first part wider than the weld.

15. A bar chain construction comprising two parallel series of spaced apart, flattened tubular sleeve members; and a series of parallel bars, extending between said two series, each extremity of each bar extending through one of said sleeves, thence returning back through an adjacent sleeve with an adjacent bar.

16. A bar chain comprising: a plurality of bent bars and a plurality of tubular sleeves, each bar being bent at its extremities, first at right angles to form end link portions; then at right angles to the end links portions and back along the bar to form shaft-sleeve portions, each of said sleeves connecting one of said shaft-sleeve portions to an adjacent bar; and means for preventing axial movement of said bars and the shaft-sleeve portions thereof in said sleeves.

17. A joint construction for conveyors comprising a pair of hingedly connected rod-like elements having parallel adjacent portions, each element having a right angled extension and a connecting clip having a portion embracing the adjacent portions of the elements and another portion extending therefrom in a narrow neck and widening out and partially abutting the extensions of the elements, said narrow neck providing for angular movements of the elements.

18. A joint construction for conveyors comprising a pair of hingedly connected rod-like elements having parallel adjacent portions, each element having a right angled extension and a connecting clip having a clamping portion embracing the parallel portions adjacent the extensions and a second portion extending therefrom and partially over the extensions, said second portion providing means for holding the elements against end-wise movement with respect to each other and permitting angular movements of the extensions.

19. A conveyor structure comprising a pair of links having certain portions positioned immediately adjacent one another in side-by-side relation and other portions extending in opposite directions from said certain portions, and a clip having a portion embracing the said certain portions of the links and another portion extending therefrom in a narrow neck and widening out and at least partially embracing the said other portions of the links, whereby relative angular movement of the links about the said certain portions is permitted by virtue of the narrow neck of the clip.

CHARLES F. CRUMB.

CERTIFICATE OF CORRECTION.

Patent No. 2,239,994. April 29, 1941.

CHARLES F. CRUMB.

It is hereby certified that error appears in the printed specification of the above numbered patent requiring correction as follows: Page 3, second column, line 32, claim 16, for the word "links" read --link--; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.